United States Patent Office 3,515,647
Patented June 2, 1970

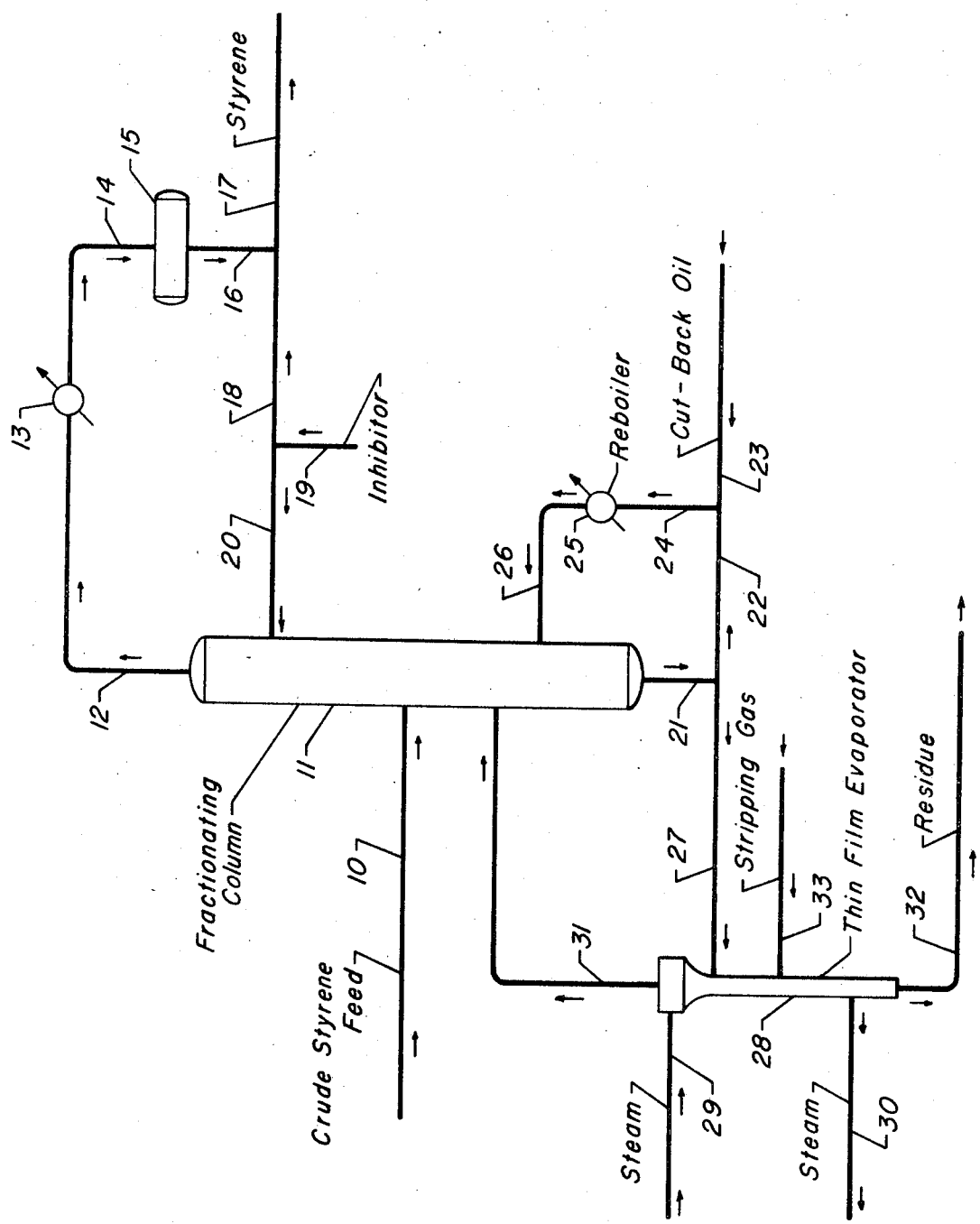

3,515,647
METHOD FOR DISTILLING STYRENE AND SUBJECTING BOTTOMS TO THIN FILM EVAPORATION
Harry M. Van Tassell and Wayne N. Root, Des Plaines, Ill., assignors to Universal Oil Products Company, Des Plaines, Ill., a corporation of Delaware
Continuation-in-part of application Ser. No. 735,425, June 7, 1968. This application Dec. 6, 1968, Ser. No. 781,867
Int. Cl. B01d 3/34, 3/28
U.S. Cl. 203—49
5 Claims

ABSTRACT OF THE DISCLOSURE

Method for purifying styrene via a distillation scheme having associated therewith a wiped wall thin film evaporator to maximize recovery of styrene from the residue material. Styrene in a purity of at least 99% by weight is recovered as a separate product stream.

CROSS-REFERENCE TO RELATED APPLICATION

This application is a continuation-in-part of our co-pending application Ser. No. 735,425, filed June 7, 1968.

BACKGROUND OF THE INVENTION

This invention relates to a method for the distillation of styrene. It particularly relates to a method for recovering styrene in high purity via a distillation scheme having associated therewith a wiped wall film evaporator to maximize recovery of styrene from the residue material.

It is known in the prior art that styrene can be recovered from the normally liquid effluent of an ethylbenzene dehydrogenation reaction zone by a series of fractionation columns commonly called a "distillation train." Usually, the last fractionating column in this train comprises a styrene purification column which operates to remove the last vestiges of contaminants, such as tars and/or other polymeric materials from the styrene.

Since the styrene monomer tends to undergo polymerization by the application of heat, it is also well known that a degradation in styrene quality will occur throughout the distillation recovery facilities due to the application of heat required for distillation. Therefore, the prior art processing techniques have utilized to a considerable extent various styrene polymerization inhibitors, such as molten sulfur, tertiarybutylcatechol, etc. It is usual practice in the prior art to recover styrene as an overhead distillation product from the final distillation column. The residue material from such a column, therefore, contains tars, polymers, sulfur inhibitor, if any, and a significant quantity of styrene. The residue material, according to prior art practices, may be further processed in separate batch distillation means to recover the residual styrene, but this is an expensive and difficult procedure to practice so the prior art generally discards the residue material for use as fuel in other processes. In short, the residue from the traditional prior art styrene finishing column has very little commercial value and the prior art has experienced considerable difficulty in disposing of this waste material.

SUMMARY OF THE INVENTION

Accordingly, it is an object of this invention to provide a fractionation method.

It is another object of this invention to provide an improved method for recovering styrene in high purity via distillation in a facile and economical manner.

One embodiment of the present invention, therefore, provides a method for purifying styrene which comprises introducing crude styrene into a distillation zone maintained under distillation conditions; withdrawing from said zone an overhead product stream comprising high purity styrene; introducing relatively non-volatile hydrocarbons into said zone; removing residuum including said non-volatile hydrocarbons, polymeric material, and styrene from said zone as a bottoms fraction; forming a thin flowing film of said bottoms fraction; subjecting said film to conditions sufficient to vaporize styrene therefrom; returning said vaporized styrene to said distillation zone; and recovering a bottoms product stream comprising non-volatile hydrocarbons and polymeric materials.

In essence, therefore, it can be seen that the present invention utilizes in its preferred embodiment a thin film evaporation technique to separate and recover additional amounts of styrene from the bottoms fraction of a styrene finishing column.

DETAILED DESCRIPTION OF THE INVENTION

As previously mentioned, the present invention has particular application in the recovery of styrene which has been made through the conventional catalytic dehydrogenation of ethylbenzene. Those skilled in the art recognize the importance of being able to produce styrene economically since this chemical is extensively employed throughout commerce as a raw material for the production of resins, plastics and elastomers. Specifically, styrene can be copolymerized with butadiene to produce high molecular weight synthetic rubber. In limited quantities, styrene may be recovered from various coal tars and crude oils. However, in recent times, the preferred commercial method is through the dehydrogenation of ethylbenzene. The raw material, ethylbenzene, can either be separated from petroleum fractions by superdistillation or can be synthetically prepared, such as through the alkylation of benzene with ethylene or ethanol. The distillation method of the present invention, however, is not to be limited by the sources from which the styrene is available. In other words, the present invention is applicable to any feedstock containing primarily styrene which is contaminated with various polymeric materials and tars.

The prior art methods for producing styrene are, generally, carried out by passing a mixture of ethylbenzene and steam over a fixed bed of dehydrogenation catalyst. Since the basic chemical reaction involved is endothermic in nature, there is associated with the reaction a significant decrease in the reaction zone temperature. Therefore, in the dehydrogenation of ethylbenzene to styrene, significant quantities of steam are necessary for use as a heat carrier, as a diluent, and as a catalyst revivifier. Typically, this amount of steam will vary from about 2 to 4 pounds of steam per pound of ethylbenzene charged into the reaction zone. Those skilled in the art are familiar with the broad concept of producing styrene via the dehydrogenation of ethylbenzene, so a description of such a process need not be presented in detail herein.

The advantages of the inventive method will be more clearly understood with reference to the attached drawing which is a schematic representation of the process flow illustrating the preferred embodiment of the invention.

DESCRIPTION OF THE DRAWING

With reference now to the attached drawing, a styrene-containing feedstock consisting primarily of styrene which is contaminated with minor quantities of tars and/or polymeric materials and which, preferably, contains normally solid sulfur as a polymerization inhibitor enters the method of the present invention via line 10. As used herein, the term "crude styrene" is intended to include any feed mixture containing primarily styrene, but which is contaminated with undesirable quantities of non-volatile monomer components including tars and/or polymeric materials herein collectively referred to as "polymers," "polymeric material," or other words of similar import. It is not a requirement of this invention that the feed material into this system contain a polymerization inhibitor, although it is preferable that it contain such an inhibitor.

The crude styrene is passed via line 10 into fractionating column 11 which contains suitable vapor-liquid contacting devices, such as bubble cap trays, perforated trays, valve trays, etc. Operating conditions in fractionator 11 are maintained preferably at a temperature from 100° F. to 250° F. and a sub-atmospheric pressure from 10 to 200 mm. Hg absolute. These conditions are chosen sufficient to produce an overhead product of high purity styrene comprising at least 99% by weight styrene which is removed from column 11 via line 12 as a vapor product. The vapor overhead fraction is condensed in condenser 13 and passed via line 14 into accumulator 15. The high purity styrene is withdrawn from accumulator 15 via line 16 and a portion of this material is passed via line 18 into admixture with, preferably, polymerization inhibitor, such as tertiarybutylcatechol, from line 19. The admixture of styrene and inhibitor is introduced as reflux into column 11 via line 20. A net overhead product consisting essentially of high purity styrene is withdrawn from the system via line 17.

A bottoms fraction comprising cut-back oil, more fully described hereinafter, polymeric material, sulfur, if any, and residual amounts of styrene is withdrawn from fractionator 11 via line 21. A circuit of bottoms material is passed via line 22, admixed with cut-back oil, as needed, such as polyethylbenzene from line 23, in sufficient amounts to maintain the bottoms material at a reduced viscosity for pumping purposes. The admixture of cut-back oil and bottoms material is passed via line 24 into reboiler 25 which may be of the vertical forced circulation type and which may be heated by steam. The vapors are withdrawn from reboiler 25 via line 26 and reintroduced into fractionating column 11 to supply the heat for distillation purposes.

As used herein, the terms "cut-back oil," "relatively non-volatile hydrocarbons," and other words of similar import are intended to be any relatively heavy material, such as a heavy hydrocarbon and, typically, may be a relatively heavy aromatic hydrocarbon, such as isopropylbenzene or polyethylbenzene. By way of emphasis, it is contemplated by the present invention that the cut-back oil may be any relatively heavy oil. The purpose of the cut-back oil is to keep the viscosity of the bottoms stream from exceeding pumpable limits. The cut-back oil also provides a means for recovering the maximum amount of styrene from the feed material, as will become more evident from the discussion concerning the wiped film evaporation technique associated with this distillation column. Also, as used herein, the term "relatively nonvolatile" as related to the cut-back oil is intended to include a property of the cut-back oil whereby no significant amount of cut-back oil vapors would pass up the column to contaminate the styrene which is being withdrawn as a product. The use of this term is not intended to mean that the cut-back oil cannot be vaporized under any conditions, but simply means that if vaporized, the vapors will not have sufficient volatility to pass up the column to contaminate the desired styrene product.

Returning now to the bottoms stream in line 21: a net residual stream is passed via line 27 into a conventional wiped or agitated film evaporator. Therefore, in evaporator 28 the net bottoms stream is formed into a thin film of liquid material containing styrene, polymeric material, cut-back oil, and sulfur, if any. This material is then desirably contacted by a rotating assembly of wipers which either meets a close clearance with the wall or which may actually lightly touch or "ride" on the film of liquid on the wall. Suitable conditions are maintained in evaporator 28 which are sufficient to vaporize the previously mentioned amount of styrene which may vary from 20% to 75% by weight styrene monomer in the total material being passed into evaporator 28. The vaporizing conditions maintained in evaporator 28 are desirably accomplished by the introduction of steam via line 29 into a jacket, not shown, in evaporator 28 with the steam condensate being withdrawn via line 30. The vaporized styrene is removed from evaporator 28 and, preferably, returned to fractionator 11 via line 31 for recovery of the styrene therein.

In addition, one embodiment of the invention includes sweeping the thin film of bottoms material with an inert gas stream, such as nitrogen or steam which enters evaporator 28 via line 33. The carrier gas is then also removed from evaporator 28 via line 31 and carries with it the vaporized styrene, as previously mentioned. It is important to note that the conditions sufficient to vaporize styrene in evaporator 28 should not, as a general rule, include conditions which will vaporize to any significant extent the cut-back oil which was added to the system via line 23.

The bottoms stream having a reduced styrene content is withdrawn from evaporator 28 via line 32 and passed out of the system for further use by means known to those skilled in the art. The residue material in line 32 now comprises solely cut-back oil, polymeric material, and sulfur inhibitor, if any.

The amount of stripping gas which is introduced into evaporator 28 via line 33 can vary considerably depending upon the amount of styrene which is contained in the bottoms material. Typically, however, the inert stripping gas flow rate may be in the range from 0.25 to 2.0 standard cubic feet of gas per pound of bottoms material being introduced into evaporator 28 via line 27.

The evaporator described herein may be chosen from a wide variety of wiped or agitated film evaporators available commercially. Representative of manufacturers of evaporators are Luwa, Pfaudler, Rodney-Hunt, and others.

The following example is provided to illustrate one specific application of the present invention.

EXAMPLE

Referring again to the drawing, 607 mols per hour of styrene-containing feed was introduced into column 11 at a temperature of about 230° F. An overhead vapor stream consisting of at least 99% by weight styrene and, typically, about 99.4% by weight styrene was withdrawn via line 12 at a temperature of 140° F. and a pressure of 40 mm. Hg absolute. These vapors were condensed at a temperature of 125° F. and 30 mm. Hg absolute with reflux (607 mols per hour) and product (600 mols per hour) being withdrawn from accumulator 15.

A net bottoms fraction containing 7 mols per hour of tar and 7 mols per hour of cut-back oil (polyethylbenzene) was removed as a product stream via line 32. The bottom of column 11 was maintained at a temperature of 210° F. and a pressure of 160 mm. Hg absolute. It was found desirable to maintain the bottom of the column at this relatively high pressure by permitting a significant amount of styrene monomer to remain in the bottoms fraction. In this example the composition of the material in line 21 contained about 65% by weight styrene monomer. Accordingly, it is distinctly preferred that the bottom of the fractionation column be maintained at a temperature in excess of 200° F. and a pressure from 120 to 180 mm. Hg absolute.

A net stream of bottoms material was continuously circulated through wiped wall evaporator 28 at a temperature of 210° F. under conditions sufficient to evaporate substantially all of the styrene monomer from the bottoms. Steam at 150 p.s.i.g. was used on the evaporator to maintain the proper temperature. The vaporized stream was removed from evaporator 28 and returned to the column via line 31.

PREFERRED EMBODIMENT

Accordingly, a preferred embodiment of the present invention includes a method for recovering styrene in high purity via distillation which comprises: (a) introducing a feed mixture comprising styrene contaminated with non-styrene monomer material into a fractionation column maintained under distillation conditions including a temperature from 100° F. to 250° F. and a pressure from 10 to 200 mm. Hg absolute; (b) introducing relatively non-volatile cut-back oil into the lower portion of said column; (c) withdrawing from said column an overhead stream comprising at least 99% by weight styrene monomer; (d) withdrawing from said column a bottoms stream comprising said cut-back oil, polymeric material, and styrene; (e) forming a thin film of said bottoms stream under conditions sufficient to vaporize styrene from said film and returning the vaporized styrene to said column; and, (f) recovering a net bottoms fraction comprising cut-back oil and polymeric material.

It is distinctly preferred that the method of the present invention be practiced whereby the bottoms stream of step (d) hereinabove contains from 20% to 75% by weight styrene monomer.

The invention claimed:

1. Method for purifying styrene which comprises introducing crude styrene containing polymeric materials into a distillation zone maintained under distillation conditions including a bottom pressure from 120 to 180 mm. Hg absolute; supplying heat to said zone by reboiler means; withdrawing from said zone an overhead product stream comprising high purity styrene; introducing as a separate stream relatively non-volatile hydrocarbons into said zone; removing from said zone, as a net distillation zone bottoms fraction, residuum including said non-volatile hydrocarbons, polymeric material, and from 20% to 75% by weight of styrene monomer based on said residuum; forming a thin flowing film of said bottoms fraction in an evaporator zone separate from said reboiler means; subjecting said film in said evaporator zone to conditions sufficient to vaporize styrene therefrom; returning said vaporized styrene to said distillation zone for withdrawal therefrom as high purity styrene in said overhead product stream; and, recovering from said evaporator zone a bottoms product stream comprising non-volatile hydrocarbons and polymeric material.

2. Method according to claim 1 wherein said film is subjected to flowing hot gaseous stream.

3. Method according to claim 2 wherein said gaseous stream comprises steam.

4. Method for recovering styrene in high purity via distillation which comprises:
(a) introducing a feed mixture comprising styrene contaminated with non-styrene monomer material into a fractionation column maintained under distillation conditions including a temperature from 100° F. to 250° F. and a bottom pressure from 120 to 180 mm. Hg absolute;
(b) supplying heat to said column by reboiler means;
(c) introducing as a separate stream relatively non-volatile hydrocarbon cut-back oil into the lower portion of said column;
(d) withdrawing from said column an overhead stream comprising at least 99% by weight styrene monomer;
(e) withdrawing from said column a net distillation zone bottoms stream comprising said cut-back oil, polymeric material, and from 20% to 75% by weight of styrene monomer based on said bottoms stream;
(f) forming a thin film of said bottoms stream in an evaporation zone separate from said reboiler means under conditions sufficient to vaporize styrene from said film and returning the vaporized styrene to said column for withdrawal therefrom as high purity styrene; and,
(g) recovering a net evaporation zone bottoms fraction from said evaporator zone comprising cut-back oil and polymeric material.

5. Method according to claim 4 wherein the bottom of said fractionation column is at a temperature in excess of 200° F.

References Cited
UNITED STATES PATENTS

| | | | |
|---|---|---|---|
| 2,336,493 | 12/1943 | Marks. | |
| 2,895,886 | 7/1959 | Schneider | 203—72 |
| 2,556,030 | 6/1951 | Coulter et al. | 203—69 |
| 2,905,596 | 9/1959 | Findlay | 203—72 |
| 2,952,675 | 9/1960 | Bolle | 203—49 |
| 3,084,108 | 4/1963 | Randall | 260—669 |
| 3,209,044 | 9/1965 | Meek et al. | 260—669 |
| 3,294,856 | 12/1966 | Huckins | 260—669 |
| 3,378,467 | 4/1968 | Colton et al. | 203—72 |
| 3,408,264 | 10/1968 | Ward | 203—9 |

FOREIGN PATENTS 900,457    7/1962    Great Britain.

WILBUR L. BASCOMB, Jr., Primary Examiner

U.S. Cl. X.R.

202—155; 203—9, 69, 78, 79, 80, 93; 260—669